United States Patent [19]

Stange

[11] Patent Number: 5,594,181
[45] Date of Patent: Jan. 14, 1997

[54] ULTRASONIC FLOW METER

[75] Inventor: Gerd Stange, Nortorf, Germany

[73] Assignee: Nu-Tech GmbH, Neumuenster, Germany

[21] Appl. No.: 434,804

[22] Filed: May 4, 1995

[30] Foreign Application Priority Data

May 4, 1994 [DE] Germany .................. 44 16 367.3

[51] Int. Cl.$^6$ ...................................... G01F 1/66
[52] U.S. Cl. ...................... 73/861.28; 73/861.27
[58] Field of Search ............ 73/861.27, 861.28, 73/861.31, DIG. 4, 597; 310/369

[56] References Cited

U.S. PATENT DOCUMENTS

| | | |
|---|---|---|
| 3,357,243 | 12/1967 | Woodcock ............... 73/861.27 |
| 3,978,726 | 9/1976 | Shih ...................... 73/861.27 X |
| 4,003,252 | 1/1977 | Dewath ................... 73/861.27 |
| 4,004,461 | 1/1977 | Lynnworth ............... 73/861.27 |
| 4,838,127 | 6/1989 | Herremans et al. ........ 73/861.28 |
| 5,440,936 | 8/1995 | Spani et al. ............. 73/861.28 |

*Primary Examiner*—Richard Chilcot
*Assistant Examiner*—Elizabeth L. Dougherty
*Attorney, Agent, or Firm*—Nixon & Vanderhye P.C.

[57] ABSTRACT

An ultrasonic flow meter has two ring-shaped piezoelectric transducers (1, 2) comprising ring-shaped piezoelectric elements or being composed of piezoelectric sections. Both the transducers (1, 2) are arranged in axial symmetry in a distance to each other. One of them is operated as the ultrasonic transmitter and the other one as ultrasonic receiver. The medium, the flow rate of which is to be measured, flows through both the transducers (1, 2) essentially parallel to the axis (L—L).

20 Claims, 2 Drawing Sheets

ULTRASONIC FLOW METER

The invention relates to an ultrasonic flow meter for the measurement of the flow rate of gaseous or liquid media.

BACKGROUND OF THE INVENTION

For industrial applications the measurement of the flow rate of gases or liquids in tubing systems is of big importance. Most of the existing measurement systems utilize the liquid or gas flow to drive a wheel with its number of turns per unit time being proportional to the flow rate. These systems however lack reliability over longer time periods.

Other known measurement systems apply ultrasound. Here the phase shift of an ultrasonic wave introduced by a flowing medium is a measure of the flow velocity of the medium. Usually an ultrasonic transmitter and an ultrasonic receiver are mounted in a tubing system with a given angle with respect to the tube axis. A corresponding example is described in EP 0 040 837 A1. Such systems have a rather complex geometry and suffer from the additional disadvantage that the measuring accuracy will be deteriorated because the phase shift depends on the cosine of the given angle which is different from 0 degrees.

Principally the flow velocity of a medium may as well be determined from the time delay of ultrasound from an ultrasonic transmitter to an ultrasonic receiver where the transmitter is operated in the pulsed mode.

BRIEF DESCRIPTION OF THE INVENTION

It is an object of the present invention to provide an ultrasonic flow meter with a simple geometry which allows a high measurement accuracy.

The ultrasonic flow meter according to the present invention has two ring-shaped piezoelectric transducers, one of which is operated as the ultrasonic transmitter and the other one as the ultrasonic receiver. Both transducers are mounted with a spacing in between and with their symmetry axes coinciding. Thus a complete axial symmetry has been realized. The angle mentioned above is zero degrees so that an optimum measurement accuracy is achieved.

Each of the transducers may be encapsulated into a separate transducer housing. On the one hand this allows protection against influences from the flow medium. On the other hand a transducer housing allows the additional placement of material for acoustic decoupling and the mounting of a damping ring surrounding the respective ring-shaped piezoelectric transducer.

In a preferred layout both the transducers are integrated into the wall of a cylindrical pipe (either directly or under application of a separate transducer housing) with its longitudinal axis coinciding with the common transducer axis. With this design the pipe cross sectional area at the transducer positions is not reduced. The ultrasonic flow meter therefore does not comprise an additional flow resistance to the medium.

Preferably both the transducers are mounted in a short pipe section which is supplied with connecting elements at its ends for the connection to the pipe system. These connecting elements may be e.g. flanges or sleeves of the kind provided for the given tubing system. Thus a compact component is available which may be mounted into a given tubing system without great effort.

The ultrasonic flow meter according to the present invention is preferably operated in self-excitation where the output voltage of the ultrasonic transducer operated as the receiver—after having been amplified—is fed back to the ultrasonic transducer operated as the transmitter. Details result from the following description.

Alternatively the ultrasonic transducer operated as the receiver is switched to measure the delay time of the ultrasound after pulsed excitation of the ultrasonic transducer operated as the transmitter. The delay time measurement is advantageous in the case of distortions of the system due to external sound coupled into the tubing system and into the housing. In this case the short run time through the tubing system or housing can be separated from the longer run time through the medium by means of an electronic gate.

DESCRIPTION OF THE DRAWINGS

In the following the invention will be further explained by way of example with reference to the accompanying drawings, wherein.

DETAILED DESCRIPTION OF THE PREFERRED EMBODIMENTS

Figure 1:
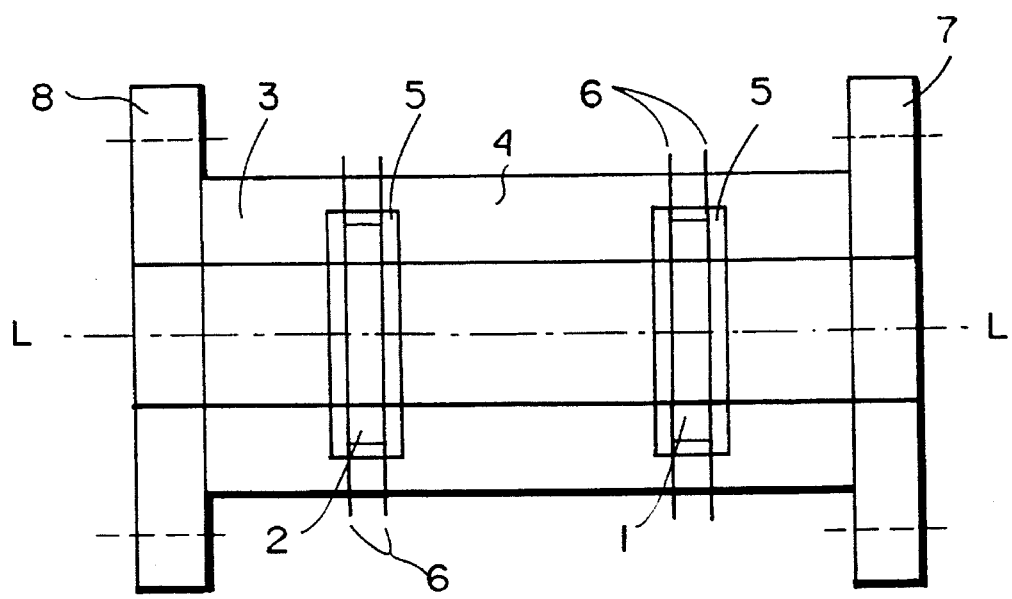
FIG. 1 shows an axial section through a piece of pipe, into which two piezoelectric transducers are integrated.

As shown in FIG. 1 a ring-shaped piezoelectric transducer 1 and a ring-shaped piezoelectric transducer 2 are arranged, at a distance to each other with their axes of symmetry coinciding. The transducers 1 and 2 may each have ring-shaped piezoelectric elements or may consist of piezoelectric sections. Both the transducers 1, 2 are located in a pipe section 3 through which the liquid or gaseous medium, the flow rate of which is to be determined, flows in the direction of the longitudinal axis L—L. The flow cross section is circular. The common axis of rotational symmetry of the transducers 1, 2 coincides with the longitudinal axis L—L.

Both the transducers 1, 2 are embedded into the wall 4 of the pipe section 3 in the same manner. A soft material 5, e.g. foam, serves as acoustical decoupling material between the transducers 1, 2 and the wall 4. The electrical connections 6 of the transducers 1, 2 are led through the wall 4 to the outside in a sealed manner. They may be simple wire conductors or thin copper sheets.

Figure 2:
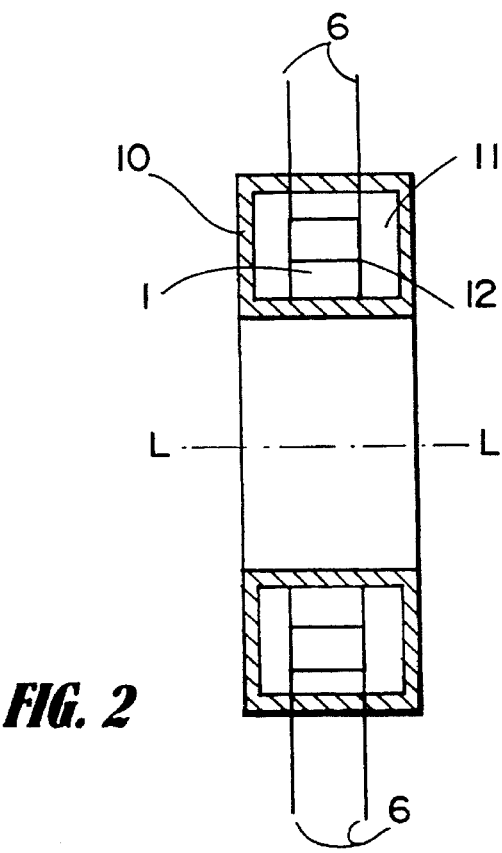
FIG. 2 shows an axial section through a piezoelectric transducer which is surrounded by a separate transducer housing.

An alternative layout consists in the transducers 1, 2 not directly being integrated into the wall 4 of the pipe section 3, but rather each of the transducers 1, 2 being surrounded by a separate transducer housing. FIG. 2 shows how the transducer 1 is arranged in such a ring-shaped transducer housing 10. A preferably soft decoupling material 11 serves as acoustic decoupling and directly on its outer periphery the transducer 1 is surrounded by a damping ring 12. The electrical connections 6 are led to the outside in a sealed manner. The transducer housing 10 may consist of e.g. a stainless metal, ceramic or plastic material. Also a metal-ceramic design is possible. Preferably the arrangements for the transducer 1 and for the transducer 2 are identical.

In the layout with separate transducer housings the transducers 1 and 2 with their transducer housings are preferably inserted into the pipe section 3 in such a way that no parts jut out into the inner pipe. In addition to the decoupling material 11 in the inner of the transducer housing further decoupling measures may be provided for between the outer side of the transducer housing and the pipe section 3, e.g. soft material 5, which is arranged in a way similarly to FIG. 1, in order to avoid that the pipe section 3 takes part in the propagation of the ultrasonic sound field. A proper decoupling may for example also be achieved by damping the pipe section 3 itself between the transducers 1 and 2 with known methods.

The pipe section 3 is provided with a flange 7 and a flange 8 at its ends. The flow sensor consisting of the pipe section 3 and both the transducers 1, 2 may therefore without great effort be integrated into an existing pipe system, in which flanges are customary.

Different manufacturing possibilities are envisioned. So the transducers 1, 2 may be moulded into the pipe, section 3 may consist of plastic material. Alternatively the system could be glued from prefabricated ring-shaped sections. Such prefabricated ring-shaped sections may be manufactured from various metallic or nonmetallic materials. Ceramic material with a metal ceramic sealing is envisioned. In order that the transducers 1, 2 which preferably consist of piezoceramic material should not come into contact with the flow medium, they may be covered with a protectional layer. Besides that the separate transducer housings mentioned already allow protection against contact with the flow medium.

Since the transducers 1, 2 do not jut out into the inner space of the pipe section 3 they do not present an obstacle for the flow medium so that its flow velocity will practically not be changed by the transducers 1, 2.

The ultrasonic flow meter has a high sensitivity if the transducers 1, 2 are operated in self-excitation (especially if this occurs close to a resonant frequency, see below), which will be explained in more detail in the following.

Figure 3:
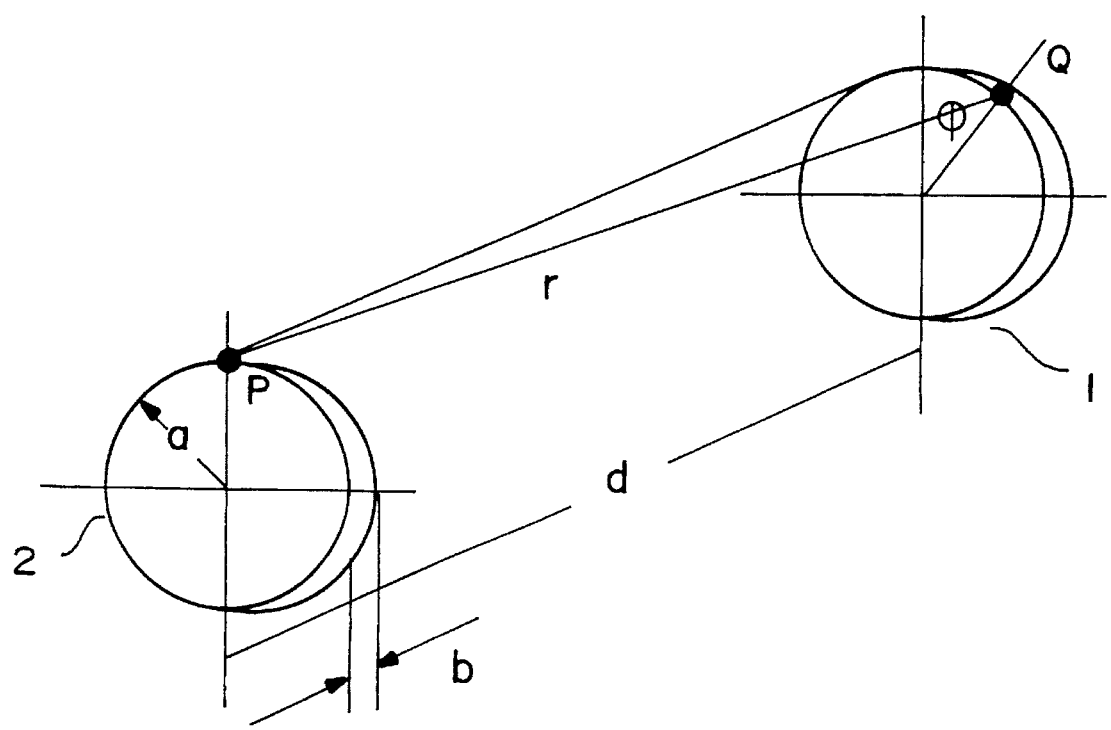
FIG. 3 shows a sketch for the illustration of the symbols applied within the formulae.

FIG. 3 illustrates the ring-shaped geometry of the system with both the transducers 1, 2 in a perspective view. The transducer 1 is operated as an ultrasonic transmitter and the transducer 2 as an ultrasonic receiver. The distance r between a source point Q at the inner surface of the transducer 1, which has the inner radius a (as has the transducer 2), and a field point P at the inner surface of transducer 2 may be derived from FIG. 3 as $$r = \sqrt{(a - a\cos\phi)^2 + (a\sin\phi)^2 + d^2} \quad . \tag{1}$$

d is the distance between the transducers 1, 2. Application of trigonometric relations leads to a transformation of eq. (1) into $$r = d\sqrt{1 + \left(2\frac{a}{d}\sin\frac{\phi}{2}\right)^2} \quad . \tag{2}$$

Now transducer 1 operated as the ultrasonic transmitter will be assumed to oscillate in a pure radial mode with the complex velocity amplitude $\underline{v_0}$ above a given cutoff frequency which depends on the diameter of the pipe section 3. (Below the cutoff frequency no transverse but rather longitudinal waves exist propagating as plane waves along the pipe section 3.) Then the sound field inside the medium with the density ρ may be described by the complex pressure amplitude p as $$\underline{p} = \frac{j\omega\rho}{2\pi} \int_S \underline{v_0} \frac{e^{-jkr}}{r} \, dS, \tag{3}$$

see Cremer, L. Hubert, M., "Vorlesungen über Technische Akustik", 4. Auflage Springer, Berlin 1990 eq. 2–217 p. 178. Here the wave number k is the quotient of the angular frequency ω of the transmitter and the sound velocity c in the medium under consideration:

$$k = \frac{\omega}{c} \quad . \tag{4}$$

The integration has to be extended across the surface S of the total sound field area under consideration. Assuming rigid walls with $\underline{v_0}=0$ everywhere on this surface except on the inner surface of the piezoelectric ring operated as the ultrasonic transmitter, the integration has to be extended across the inner ring surface of transducer 1 only.

To a first approximation the radius a may be assumed to be small compared to the distance d between the transducers 1 and 2 (see FIG. 3):

$$a < d. \tag{5}$$

The integrand of eq. (3) may then be expanded into a Taylor's series which with eq. (2) under consideration of first order terms leads to:

$$\frac{e^{-jkd\sqrt{1 + \left(2\frac{a}{d}\sin\frac{\phi}{2}\right)^2}}}{d\sqrt{1 + \left(2\frac{a}{d}\sin\frac{\phi}{2}\right)^2}} \approx \tag{6}$$

$$\frac{e^{-jkd}}{d}\left[1 - (1 + jkd)2\left(\frac{a}{d}\sin\frac{\phi}{2}\right)^2\right].$$

For the pressure field it follows from eq. (3):

$$\underline{p} = 2\frac{j\omega\rho}{2\pi}\underline{v_0}\frac{ba}{d}e^{-jkd}\int_0^\pi \left[1 - (1 + jkd)2\left(\frac{a}{d}\sin\frac{\phi}{2}\right)^2\right]d\phi. \tag{7}$$

After having performed the integration one receives:

$$\underline{p} \approx j\omega\rho\,\underline{v_0}\frac{ab}{d}e^{-jkd}\left[1 - \frac{a^2}{d^2} - jkd\frac{a^2}{d^2}\right]. \tag{8}$$

This result may easily be interpreted: A sound wave propagating in the axial direction from the ultrasonic transmitter 1 to the ultrasonic receiver 2 placed at a distance d undergoes a phase delay being composed of the expected phase delay kd plus the correction term $$\Delta\phi = \arctan\frac{kd\frac{a^2}{d^2}}{1 - \frac{a^2}{d^2}}, \tag{9}$$

which under the assumption according to eq. (5) may approximately be expressed as $$\Delta\phi \approx kd\frac{a^2}{d^2} \quad . \tag{10}$$

This correction terms summarizes the path length differences between all the source points on the ultrasonic transmitter ring 1 and a field point on the ultrasonic receiver ring 2. The correction is smaller the larger the distance d between the transducers 1 and 2 is compared to the inner radius a of the ring-shaped transducers 1 and 2.

The pressure field observed at the ultrasonic receiver 2 will be transformed into a corresponding output voltage since the ultrasonic receiver is a piezoelectric transducer. This signal as a feed back signal will now be amplified and fed back to the piezoelectric transducer 1 operated as the ultrasonic transmitter. This may lead to a self-excitation of the system under the condition that the phase difference between the input voltage of the ultrasonic transmitter and the output voltage of the ultrasonic receiver is zero or an integer multiple of $2\pi$. This total phase difference consists of two contributions, the one due to the sound propagation and the other one from the sum of the internal phase shifts of the ultrasonic transmitter and receiver, respectively. The latter vanishes if both the transducers 1 and 2 have the same physical properties. This may be achieved, e.g., by selecting them as pairs manufactured under the same conditions.

A further embodiment uses a pair of an ultrasonic transmitter and an ultrasonic receiver with the same properties by cutting a piezoelectric ring into two half rings. Then one of these half rings may be operated as the ultrasonic transmitter and the other one as the ultrasonic receiver.

To achieve self-excitation of the system therefore the phase shift due to the sound propagation has to be an integer multiple of $2\pi$. Taking into account eqs. (8), (9) and (10) the following condition for the axial distance d between the ultrasonic transmitter and the ultrasonic receiver, for which at a given angular frequency $\omega = c\ k$ self-excitation occurs, may be derived:

$$kd + \arctan k \frac{a^2}{d^2} = n2\pi. \tag{11}$$

With the addition theorem for the tangent function it follows $$\frac{\tan kd + k\frac{a^2}{d}}{1 - k\frac{a^2}{d}\tan kd} = 0 \tag{12}$$

or $$\tan kd = -k\frac{a^2}{d}. \tag{13}$$

Eq. (13) may be solved for d iteratively. For this purpose the correction term $\delta$ will be defined by $$\delta + n\lambda = d, \tag{14}$$

where $\lambda = 2\pi/k$ is the wavelength of the ultrasound and n is a natural number. From eqs. (13) and (14) the iteration condition $$\delta = -\frac{1}{k}\arctan\left(\frac{a^2}{n\lambda + \delta}\right) \tag{15}$$

follows.

In the following a numerical example of the iteration process will be presented for two different values of n.

The ultrasonic frequency $f = \omega/(2\pi)$ is assumed to be 150 kHz in each case and the velocity of sound c 1400 m/s leading to a sound wave length $\lambda$ of $9.330 \cdot 10^{-3}$ m; for a value of 0.01 m has been assumed. The starting value for $\delta$ in both cases is assumed to be $-2 \cdot 10^{-3}$ m. The following table shows four iterational steps to be sufficient:

| $n = 1$: | $n = 5$: |
|---|---|
| $-2.172 \cdot 10^{-3}$ m | $-1.460 \cdot 10^{-3}$ m |
| $-2.333 \cdot 10^{-3}$ m | $-1.450 \cdot 10^{-3}$ m |
| $-2.179 \cdot 10^{-3}$ m | $-1.455 \cdot 10^{-3}$ m |
| $-2.176 \cdot 10^{-3}$ m | $-1.455 \cdot 10^{-3}$ m |

The derivation given above is valid for any ultrasonic frequency. However the system works especially efficiently if both the transducers 1 and 2 are operated close to a resonant frequency. Namely at the resonant frequency the electrical power will be optimally transformed into sound field power and vice versa. This will once more be illustrated: The self-excitation of the closed loop system consisting of transmitter, sound propagation path, receiver and electrical feed back including the amplifier has to be distinguished from the resonant frequency of the transducers. Principally self-excitation is possible at any ultrasonic frequency if additionally the phase condition in the sound field is fulfilled and a sufficient amplification is guaranteed. However especially preferable is the selection of a self-excitation frequency which coincides with the transducer resonant frequency. Namely in this case a small amount only of amplification in the electrical signal feed back path is required.

In practice the parameters for an ultrasonic transmitter-receiver pair may be determined according to the following scheme:

Selection of a proper eigenmode (radial oscillation) of the piezoelectric system, where both the transducers 1 and 2 have the same properties.

From this the operating frequency at self-excitation results as the eigenfrequency; the sum of the internal phase delays vanishes.

Selection of the natural number n, i.e. the number of wavelengths between ultrasonic transmitter and receiver.

Determination of the correct distance d by application of eq. (14).

Until now the medium in which the sound waves propagate between ultrasonic transmitter and ultrasonic receiver has been assumed to be at rest. Now a constant flow velocity v will be considered which is a measure of the flow rate.

In the case of a moving medium the propagation velocity of the ultrasound increases or decreases depending on whether the direction of the sound field propagation is in the direction of the flow velocity or opposite to it. If operating with a fixed sound field frequency, the wavelength changes, resulting in a phase shift. Assuming the system to be tuned to self-excitation with the medium at rest, where $f_0$ is the ultrasonic frequency of an eigenmode as explained before, the system would be detuned at a nonvanishing flow velocity, since the phase condition according to eq. (14) is no longer fulfilled. If however another sound field frequency will be selected as to keep the wavelength $\lambda$ fixed at the value $\lambda_0$ under consideration of eq. (14), the system may be held in the state of self-excitation even for nonvanishing flow velocity. The corresponding condition may be expressed as $$\frac{c + v}{f_0 + \Delta f} = \lambda_0, \tag{16}$$

where $\Delta f$ is the frequency shift. From eq. (16) it follows $$\Delta f = \frac{f_0}{c}v = \frac{v}{\lambda_0}. \tag{17}$$

For a narrow resonant curve of the transducers 1 and 2, i.e. for a pronounced maximum, the frequency shift leads to an operating point off the maximum so that the oscillation amplitude of the transducers 1, 2 would rapidly decrease for a flow measurement. For a stable operation under self-excitation conditions this is problematic, also if an amplifier will be applied. A proper countermeasure exists in an enhanced bandwidth of the system, i.e. a broadening of the resonant curve which is e.g; achievable if transducer housing and attached mechanical components (see e.g. FIG. 2)

have resonances close to the selected resonance of the piezoelectric components. In this case the resonant curve behaves as that of coupled resonators. For a flat resonant curve sufficient damping is required.

The proper tune shift Δf will be automatically established by the system since the closed transmitter-sound path-receiver system tends to keep the state of self-excitation in order to fulfill the phase condition. This is the case if the system operates at the tune shift corresponding to the flow velocity v.

Until here the velocity of sound has been assumed to be constant or to depend on the flow velocity of the medium, respectively.

In practice, however, this will be correct for a constant temperature only. Deviations from this temperature cause changes in the velocity of sound resulting in additional phase changes. To compensate for this effect, the frequency has to be further tuned in order to keep the state of self-excitation. In practice, the tune shift due to temperature effects often exceeds that due to the flow velocity. However the temperature effect may be compensated for by measuring in both directions of sound propagation, i.e. parallel and antiparallel to the direction of flow and then taking into account the difference of the tune shifts. The bandwidth has to cover the sum of the tune shifts according to the temperature and the flow velocity.

In order to measure in both directions, each of the transducers 1, 2 has to be operated selectively as ultrasonic transmitter and as ultrasonic receiver. Whereas—as assumed until now—the transducer 1 operates as the ultrasonic transmitter and transducer 2 as the ultrasonic receiver, their roles will be interchanged for the measurement in the opposite direction. This may be achieved by proper circuit means known to the skilled person.

The flow velocity v of the medium is a measure of the flow rate. To deduce the mass of the medium passing the region of the transducers 1, 2 per unit time, the flow velocity has to be multiplied by the density of the medium and the cross sectional area. If the flow velocity is not constant across the cross section the dependence of the flow rate on the measured tune shift may be determined by calibration measurements.

A further possibility for determining the flow velocity of the flowing medium exists in measuring the delay time an ultrasonic pulse needs to travel from the ring-shaped piezo-electric transducer operated as the ultrasonic transmitter to the ring-shaped piezoelectric transducer operated as the ultrasonic receiver. For a known distance between the transducers the delay time is a measure of the propagation velocity of the ultrasound depending on the flow velocity and the flow direction.

In contrast to the method of self-excitation, which requires a quasistationary operation periodic in time, the delay time measurement operates in the pulsed mode. This offers the advantage to discriminate between the sound propagation inside the walls of the pipe section and the sound propagation through the flowing medium to be measured by electronic means with the help of a gate. Further advantages are due to the clear separation possibilities against distortions, e.g. by sound radiation from outside or from reflexions of ultrasonic waves. A delay time measurement is also advantageous in the case of nonsufficient acoustic decoupling between transducers and pipe section or housing.

Temperature effects may—similarly to what has already been described for the self-excitation method—be eliminated by parallel and antiparallel measurements with respect to the flow direction of the medium to determine the time delay difference where the roles of ultrasonic transmitter and receiver have to be interchanged.

I claim:

1. Ultrasonic flow meter, comprising two ring-shaped piezoelectric transducers which have ring-shaped piezo elements, the transducers being spaced to each other in axial symmetry and one of them being operated as an ultrasonic transmitter and the other one as an ultrasonic receiver, a medium, the flow rate of which is to be measured, flows through both the transducers essentially parallel to the symmetry axis of the transducer, wherein an output voltage of the transducer operated as the ultrasonic receiver is fed back to the transducer operated as the ultrasonic transmitter after amplification.

2. Ultrasonic flow meter according to claim 1, wherein each transducer is surrounded by a separate transducer housing.

3. Ultrasonic flow meter according to claim 1, wherein both the transducers are integrated into the wall of a cylindrical pipe, the longitudinal axis of said cylindrical pipe coincides with the common axis of the transducers and wherein the pipe cross section at the positions of the transducers is the same as in the remainder of the cylindrical pipe.

4. Ultrasonic flow meter according to claim 3, wherein both the transducers are acoustically decoupled from the wall of the cylindrical pipe by the transducer being embedded into soft material.

5. Ultrasonic flow meter according to claim 3, characterised in that both the transducers are arranged inside said cylindrical pipe, which is provided with connecting elements at its ends for the connection to a pipe system.

6. Ultrasonic flow meter according to claim 1, wherein both the transducers have substantially identical physical properties and wherein for self-excitation of the system in a radially oscillating mode of the transducers the relation $$d=\delta+n\lambda$$

holds between the axial distance d between both the transducers and the sound wavelength $\lambda$, where n is a natural number and for $\delta$ the iteratively solvable equation $$\delta=(-\lambda/(2\pi))\arctan(a^2/(n\lambda+\delta))$$

holds, where a is the inner radius of the transducers.

7. Ultrasonic flow meter according to claim 6, wherein the flow velocity v of the medium results from the relation $$(c+v)/(f_0+\Delta f)=\lambda_0,$$

wherein $f_0$ is the ultrasonic frequency at self-excitation with the medium being at rest, which has the velocity of sound c, where $\Delta f$ is the frequency tune shift at self-excitation in the medium with the flow velocity v and where $\lambda_0=c/f_0$ is the sound wavelength for which d is determined according to claim 6.

8. Ultrasonic flow meter according to claim 6, wherein both the transducers are operated in self-excitation close to a resonant frequency of a radially oscillating mode.

9. Ultrasonic flow meter according to claim 8, wherein the resonant curve is broadened.

10. Ultrasonic flow meter according to claim 1, wherein each of the transducers is selectively operable as an ultrasonic transmitter or as an ultrasonic receiver.

11. Ultrasonic flow meter, comprising two ring-shaped piezoelectric transducers which are composed of piezoelectric sections, both the transducers being spaced to each other in axial symmetry and one of them being operated as an ultrasonic transmitter and the other one as an ultrasonic receiver, wherein a medium, the flow rate of which is to be measured, flows through both the transducers essentially parallel to the symmetry axis of the transducer, and an output voltage of the transducer operated as the ultrasonic receiver is fed back to the transducer operated as the ultrasonic transmitter after amplification.

12. Ultrasonic flow meter according to claim 11, wherein both the transducers have essentially identical physical properties and wherein for self-excitation of the system in a radially oscillating mode of the transducers the relation $$d=\delta+n\lambda$$

holds between the axial distance d between both the transducers and the sound wavelength $\lambda$, where n is a natural number and for $\delta$ the iteratively solvable equation $$\delta=(-\delta/(2\pi))\arctan(a^2/(n\lambda+\delta))$$

holds, where a is the inner radius of the transducers.

13. Ultrasonic flow meter according to claim 12, wherein the flow velocity v of the medium results from the relation $$(c+v)/(f_0\Delta f)=\lambda_0,$$

where $f_0$ is the ultrasonic frequency at self-excitation with the medium being at rest, which has the velocity of sound c, where $\Delta f$ is the frequency tune shift at self-excitation in the medium with the flow velocity v and where $\lambda_0=c/f_0$ is the sound wavelength for which d is determined according to claim 12.

14. Ultrasonic flow meter according to claim 12, wherein both the transducers are operated in self-excitation close to a resonant frequency of a radially oscillating mode.

15. Ultrasonic flow meter according to claim 14, wherein the resonant curve is broadened.

16. Ultrasonic flow meter according to claim 11, wherein each transducer is surrounded by a separate transducer housing.

17. Ultrasonic flow meter according to claim 11, wherein both the transducers are integrated into the wall of a cylindrical pipe, the longitudinal axis of said cylindrical pipe coincides with the common axis of the transducers and wherein the pipe cross section at the positions of the transducers is the same as in the remainder of the cylindrical pipe.

18. Ultrasonic flow meter according to claim 17, wherein both transducers are embedded in soft material to acoustically decouple the transducers from the wall of the pipe.

19. Ultrasonic flow meter according to claim 17, wherein both transducers are arranged inside said cylindrical pipe, which is provided with connecting elements at its ends for connection to a pipe system.

20. Ultrasonic flow meter according to claim 11, wherein each of the transducers is selectively operable as an ultrasonic transmitter or as an ultrasonic receiver.

* * * * *